United States Patent
Desclos et al.

(10) Patent No.: US 8,843,085 B2
(45) Date of Patent: Sep. 23, 2014

(54) PRE-OPTIMIZATION OF TRANSMIT CIRCUITS

(75) Inventors: Laurent Desclos, San Diego, CA (US); Jeffrey Shamblin, San Marcos, CA (US); Sebastian Rowson, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 13/608,895

(22) Filed: Sep. 10, 2012

(65) Prior Publication Data

US 2013/0122836 A1 May 16, 2013

Related U.S. Application Data

(60) Provisional application No. 61/532,733, filed on Sep. 9, 2011.

(51) Int. Cl.
*H04B 1/44* (2006.01)
*H04B 1/04* (2006.01)

(52) U.S. Cl.
CPC ............... *H04B 1/04* (2013.01); *H04B 1/0458* (2013.01)
USPC ............ 455/78; 455/121; 455/126; 343/745

(58) Field of Classification Search
CPC ................................ H04B 1/04; H04B 1/0458
USPC ................ 455/73, 78, 83, 87, 107, 120, 121, 455/123–125, 129, 550.1; 333/109, 124; 343/703, 742, 745, 752; 600/509
See application file for complete search history.

(56) References Cited

U.S. PATENT DOCUMENTS

| | | | |
|---|---|---|---|
| 6,556,814 B1 * | 4/2003 | Klomsdorf et al. | 455/121 |
| 6,907,283 B2 * | 6/2005 | Carter et al. | 600/509 |
| 6,993,297 B2 * | 1/2006 | Smith, Jr. | 455/82 |
| 7,865,154 B2 * | 1/2011 | Mendolia et al. | 455/125 |
| 2007/0049213 A1 * | 3/2007 | Tran | 455/78 |
| 2007/0149145 A1 * | 6/2007 | Chang et al. | 455/78 |
| 2009/0253385 A1 * | 10/2009 | Dent et al. | 455/83 |
| 2010/0248651 A1 * | 9/2010 | Dent | 455/78 |
| 2012/0112852 A1 * | 5/2012 | Manssen et al. | 333/105 |

\* cited by examiner

*Primary Examiner* — Temesgh Ghebretinsae
*Assistant Examiner* — Dong-Chang Shiue
(74) *Attorney, Agent, or Firm* — Coastal Patent Law Group, PC.; Joshua S. Schoonover

(57) ABSTRACT

An impedance tuning and optimization technique is described wherein an impedance interface is dynamically tuned prior to applying transmit power to the circuit. A coupled signal injected into the antenna port is used to optimize the tuning state of a tuning component such that the impedance properties of the circuit are optimized prior to application of transmit power. A coupled or injected signal at an alternate frequency band can be utilized to determine tuning state or parameters at the frequency of interest by first tuning at the frequency of the coupled or injected signal and then accessing a data base containing information that relates tuning parameters across multiple frequency bands for various levels of antenna de-tuning. A time-savings is realized when the tuning circuit is optimized prior to activation or use of the transmit/receive path.

2 Claims, 12 Drawing Sheets

Antenna 1 is transmitting    Antennas 2, 3, and 4 are not transmitting

Antenna 1 is transmitting

Antennas 2, 3, and 4 are not transmitting

PRE-OPTIMIZATION OF TRANSMIT CIRCUITS

CROSS-REFERENCE TO RELATED APPLICATIONS

This application claims benefit of priority with U.S. Provisional Application Ser. No. 61/532,733, filed Sep. 9, 2011, and titled "Pre-Optimization of Transmit Circuits"; the contents of which are hereby incorporated by reference.

BACKGROUND OF THE INVENTION

1. Field of the Invention

The present invention relates to antenna systems and more particularly to an antenna system and method for implementing and maintaining a matched condition for an antenna system.

2. Related Art

The vast majority of antennas used in communication systems to date have been passive antennas that are impedance matched over a set frequency range. The antenna is typically connected to a transceiver which contains a transmitter and/or a receiver. The antenna and transceiver combination are used to transmit and receive signals over the set frequency range. If changes to the environment in the vicinity of the antenna occur, the antenna can de-tune. The de-tuning of the antenna is caused by a change in impedance properties of the antenna related to environmental changes such as portions of a human body being positioned close to the antenna, or wood, metal, or plastic objects becoming positioned in close proximity to the antenna. The change in antenna impedance properties results in an increase in reflected power at the antenna/transceiver junction; this increase in reflected power results in less power transmitted by the antenna in the transmit mode, and less power received by the antenna when in the receive mode.

As communication systems become more complex, the frequency range required for the antenna to operate increases, thereby placing an increased burden on the antenna designer to impedance match the antenna over a larger frequency range. The use of communication systems in dynamic environments, where changes to the local environment in the vicinity of the antenna can cause de-tuning of the antenna impedance, can result in degraded communication system performance.

Recent trends in radiofrequency (RF) component technology have resulted in improved performance from tunable components such as RF switches, tunable capacitors, and MEMS devices. The improved performance achieved by these new components can be measured in component efficiency characteristics, size, and cost.

SUMMARY OF THE INVENTION

In view of the above, an impedance tuning and optimization technique is provided wherein an impedance interface is dynamically tuned prior to applying transmit power to the circuit. The technique is useful for antenna systems as well as RFID and similar applications. A coupled signal injected into the antenna port is used to optimize the tuning state of a tuning component such that the impedance properties of the circuit are optimized prior to application of transmit power. A coupled or injected signal at an alternate frequency band can be utilized to determine tuning state or parameters at the frequency of interest by first tuning at the frequency of the coupled or injected signal and then accessing a data base containing information that relates tuning parameters across multiple frequency bands for various levels of antenna de-tuning. A time-savings is realized when the tuning circuit is optimized prior to activation or use of the transmit/receive path.

DETAILED DESCRIPTION OF THE PREFERRED EMBODIMENTS

With reference to the appended figures, certain examples are provided for the purpose of illustrating a number of inventive features. Although particular examples are referenced, these examples are for illustrative purposes and are not intended to be limiting in scope. Rather, those having skill in the art will understand that certain modifications may be implemented to yield substantially similar results.

For purposes herein, the term pre-optimization of transmit circuits refers to a matched condition within which transmission from the circuit is optimized.

Additionally, for purposes herein the term "tunable antenna" refers to an antenna element coupled to at least one tunable component. The tunable component may be selected from the group consisting of: an RF switch, a voltage controlled tunable capacitor, a voltage controlled tunable phase shifter, a MEMS capacitor, a MEMS switch, a FET, a varactor diode, and a switch. Alternatively, the tunable component may comprise any component capable of coupling with an antenna element and adjusting a reactance thereof.

Figure 1A:
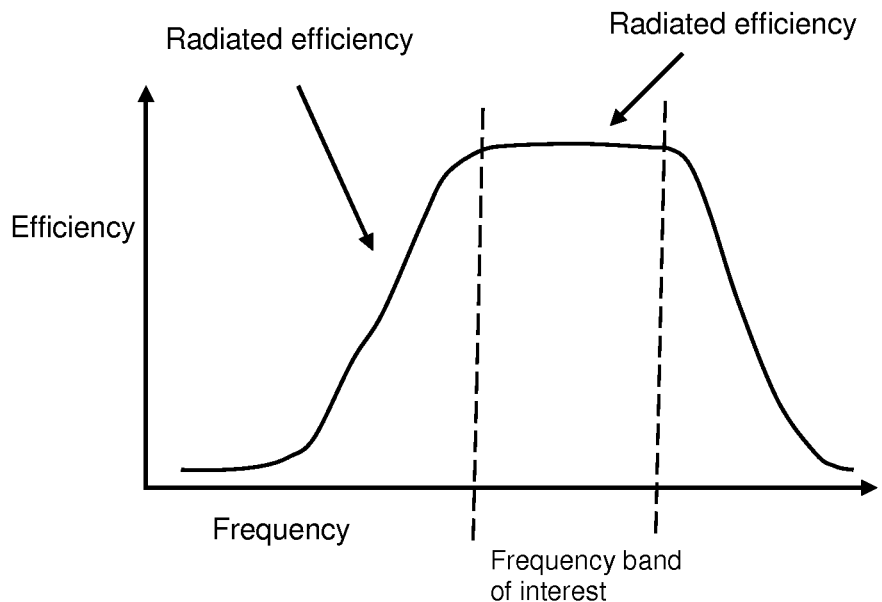
FIG. 1 illustrates a schematic of a passive antenna connected to a transceiver and a plot showing the radiated efficiency as a function of frequency for the antenna and power amplifier combination.
Figure 1B:
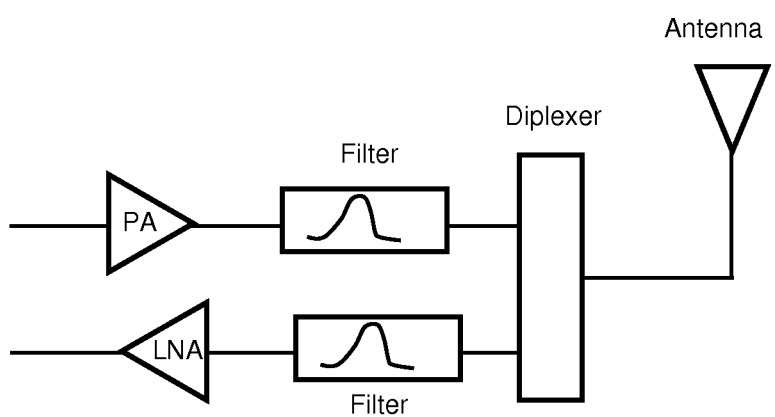

Now turning to the drawings, FIG. 1 illustrates a schematic of a passive antenna connected to a transceiver. The transceiver comprises a diplexer connected to a power amplifier (PA) and filter along a first line and a low-noise amplifier (LNA) and filter along a second line. A respective plot is shown; the plot describes the radiated efficiency of the antenna and power amplifier combination as a function of frequency.

Figure 2A:
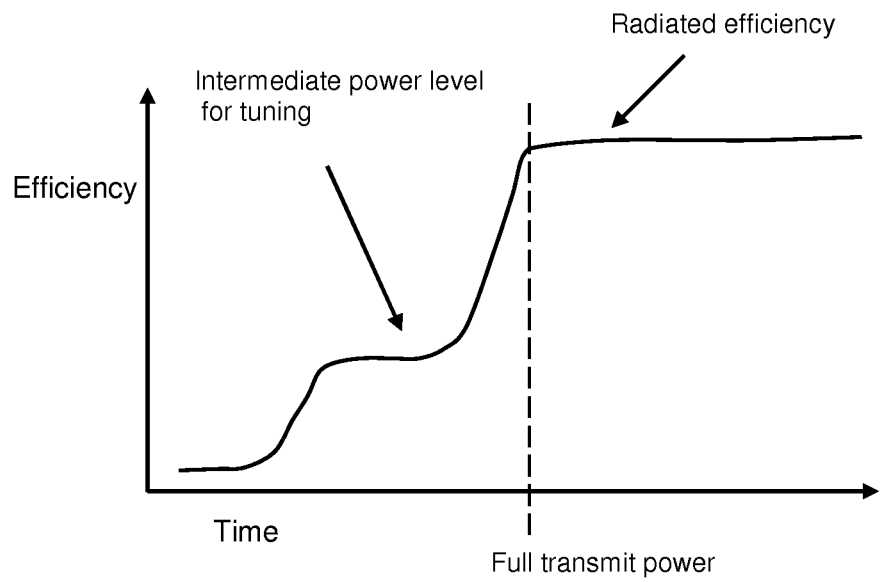
FIG. 2 shows a schematic of a tunable antenna connected to a transceiver and a plot showing the radiated efficiency as a function of time for the antenna and power amplifier combination; an intermediate power level is used to provide an opportunity to tune the active antenna to improve the impedance match.
Figure 2B:
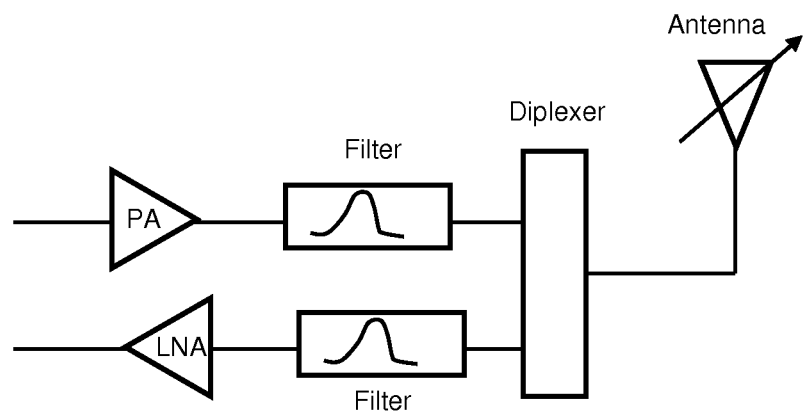

FIG. 2 illustrates a schematic of a tunable antenna connected to a transceiver as described in FIG. 1. An associated plot describes the radiated efficiency of the antenna and power amplifier combination as a function of time. An intermediate power level is used to provide an opportunity to tune the active antenna to improve the impedance match.

Figure 3A:
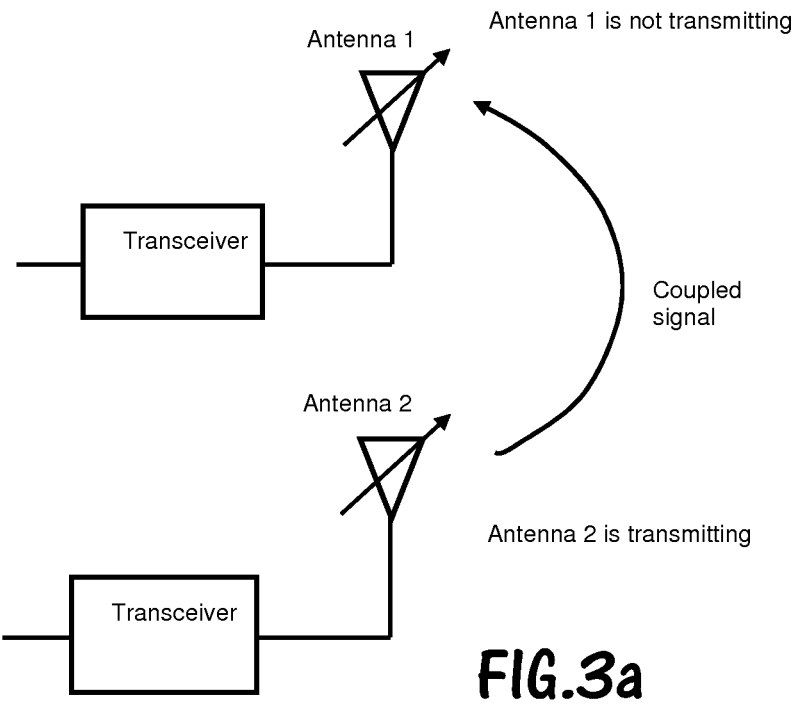
FIG. 3 illustrates a dual antenna system where each of the antennas is tunable, and a plot of the coupling as a function of frequency between the antennas.
Figure 3B:
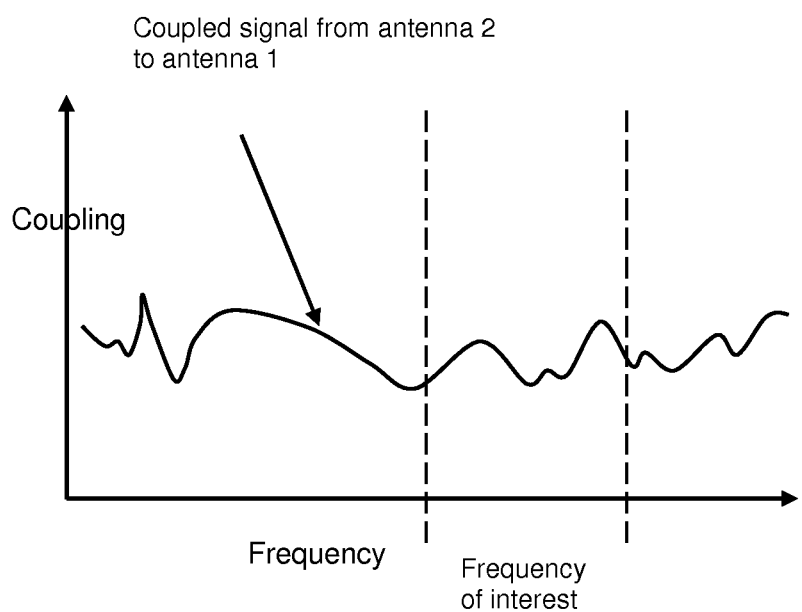

FIG. 3 illustrates a two antenna system, comprising a first antenna element 1 and a second antenna element 2, where each of the two antennas are tunable. Second antenna element 2 is transmitting an RF signal, while first antenna element 1 is in a receive-only mode. A portion of the transmitted signal from second antenna element 2 is coupled into first antenna element 1, and a plot of the coupling as a function of frequency between antennas 1 and 2 is shown.

Figure 4A:
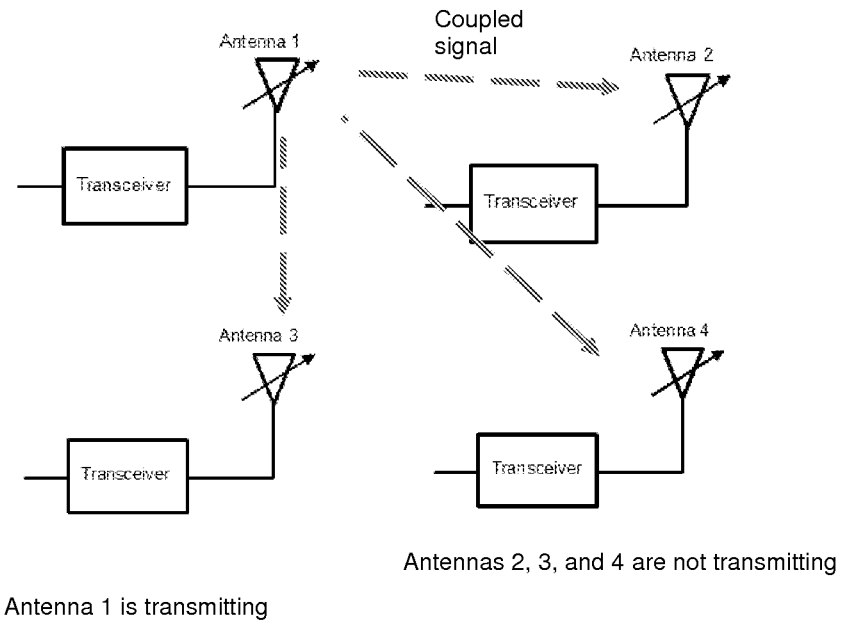
FIG. 4 illustrates an antenna system comprising four tunable antennas and transceivers, and a respective plot showing coupling as a function of frequency between the antennas.
Figure 4B:
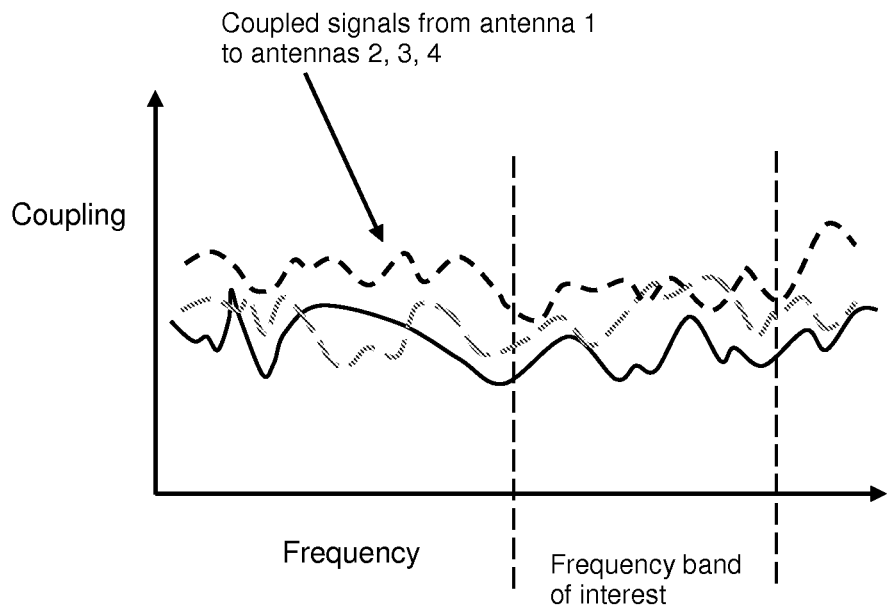

FIG. 4 illustrates a four antenna system, where all four antennas are tunable. Antenna 1 is transmitting an RF signal, while antennas 2, 3, and 4 are in a receive-only mode. A portion of the transmitted signal from antenna 1 is coupled into antennas 2, 3, and 4 and a plot of the coupling as a function of frequency between antennas 1, 2, 3, and 4 is shown.

Figure 5A:
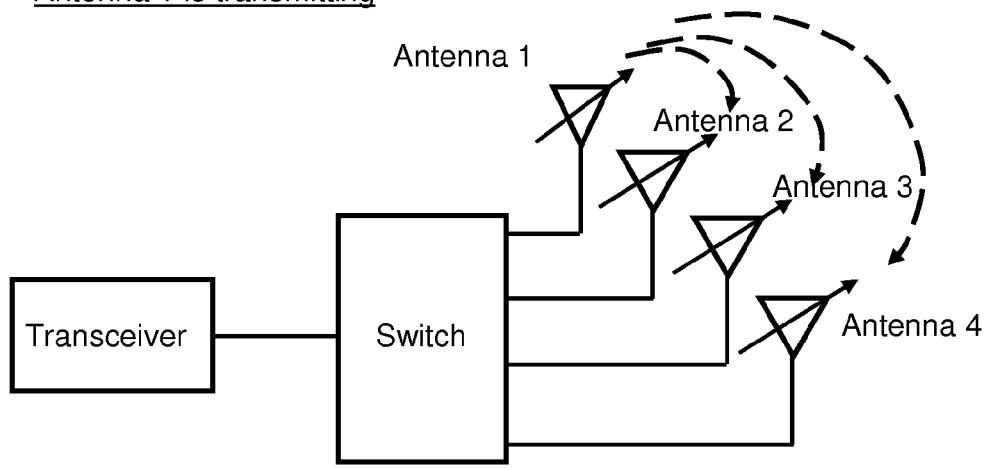
FIG. 5 illustrates an antenna system comprising four tunable antennas coupled to a shared transceiver, and a respective plot showing coupling as a function of frequency between the antennas.
Figure 5B:
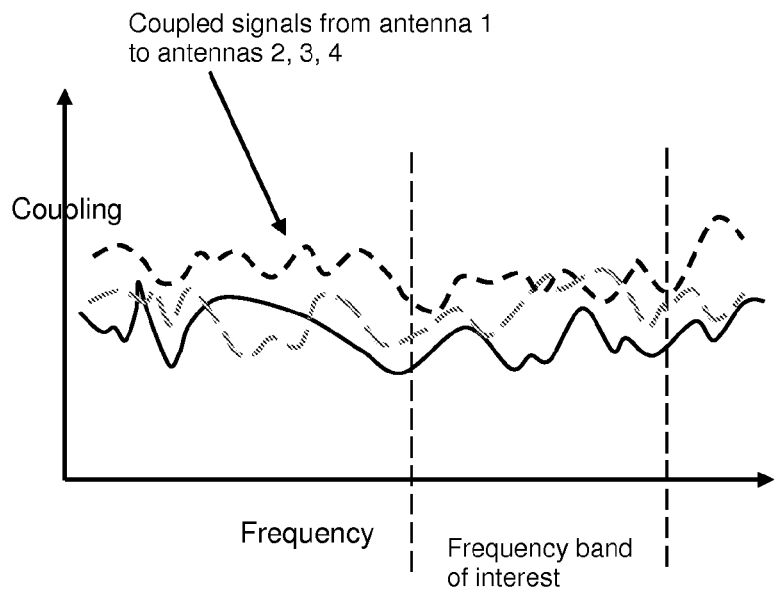

FIG. 5 illustrates a four antenna system, where all four antennas are tunable. A common transmitter is used, with a switch configured to connect the antennas to the transmitter. Antenna 1 is transmitting an RF signal, while antennas 2, 3, and 4 are in a receive-only mode. A portion of the transmitted signal from antenna 1 is coupled into antennas 2, 3, and 4 and a plot of the coupling as a function of frequency between antennas 1, 2, 3, and 4 is shown.

Figure 6:
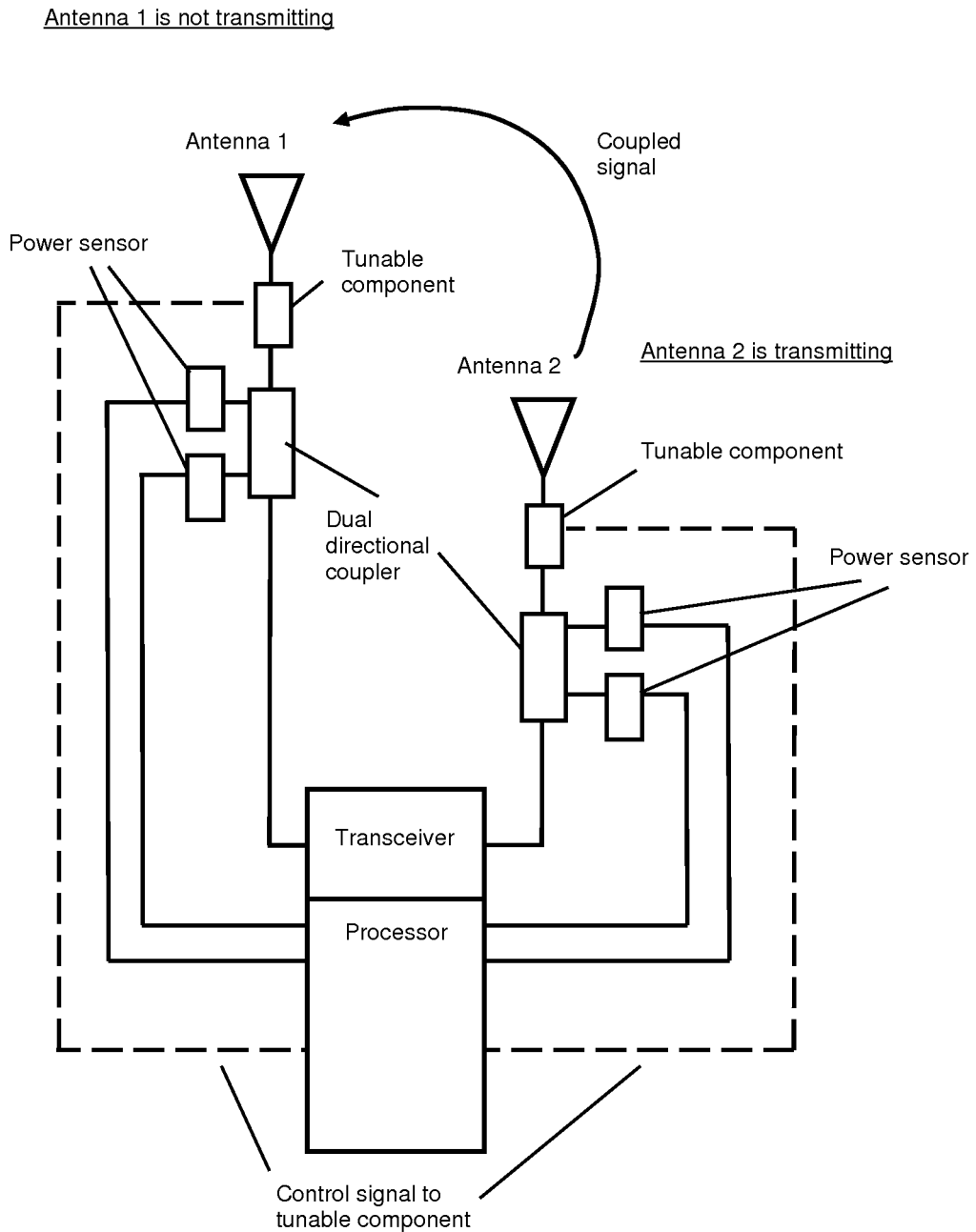
FIG. 6 illustrates an example of an antenna system adapted for pre-optimization; the antenna system comprises two tunable antennas coupled to a transceiver and a processor.

FIG. 6 is a schematic example of a two antenna system adapted for pre-optimization, where each of the two antennas are coupled to at least one tunable component. The first antenna element 1 is coupled to a first tunable component to form a first tunable antenna, and the second antenna element 2 is coupled to a second tunable component to form a second tunable antenna. Each of the first and second tunable components are further coupled to a transceiver and a processor. The first tunable component is coupled to a first dual directional coupler adapted to split a signal between a connection with the transceiver and one or more connections with the processor and respective power sensors as shown. Similarly, the second tunable component is coupled to a second dual directional coupler adapted to split a signal between a connection with the transceiver and one or more connections with the processor and respective power sensors as shown. The power sensors coupled to the first dual directional coupler are referred to as the first pair of power sensors, whereas the power sensors connected to the second dual directional coupler are referred to as the second pair of power sensors. A first conductive trace connects the processor to the first tunable component for communicating control signals, and a second conductive trace connects the processor to the second tunable component for communicating control signals. The control signals are used to vary a reactance on the tunable components, respectively.

Moreover, this circuit is used to measure forward and reflected power, which is a measure of the power applied to the antenna and the power reflected from the antenna port due to mismatched conditions, respectively. The two port transceiver is connected to the two tunable antennas. The control signals from the processor are used to adjust the tunable component to minimize reflected power at the antenna port. Second antenna 2 is transmitting an RF signal, while first antenna 1 is in a receive-only mode. A portion of the transmitted signal from second antenna 2 is coupled into first antenna 1, the signal is sampled in the processor and control signals are generated for communicating to the tunable components for adjusting the reactance and reducing loss of the antennas.

Figure 7:
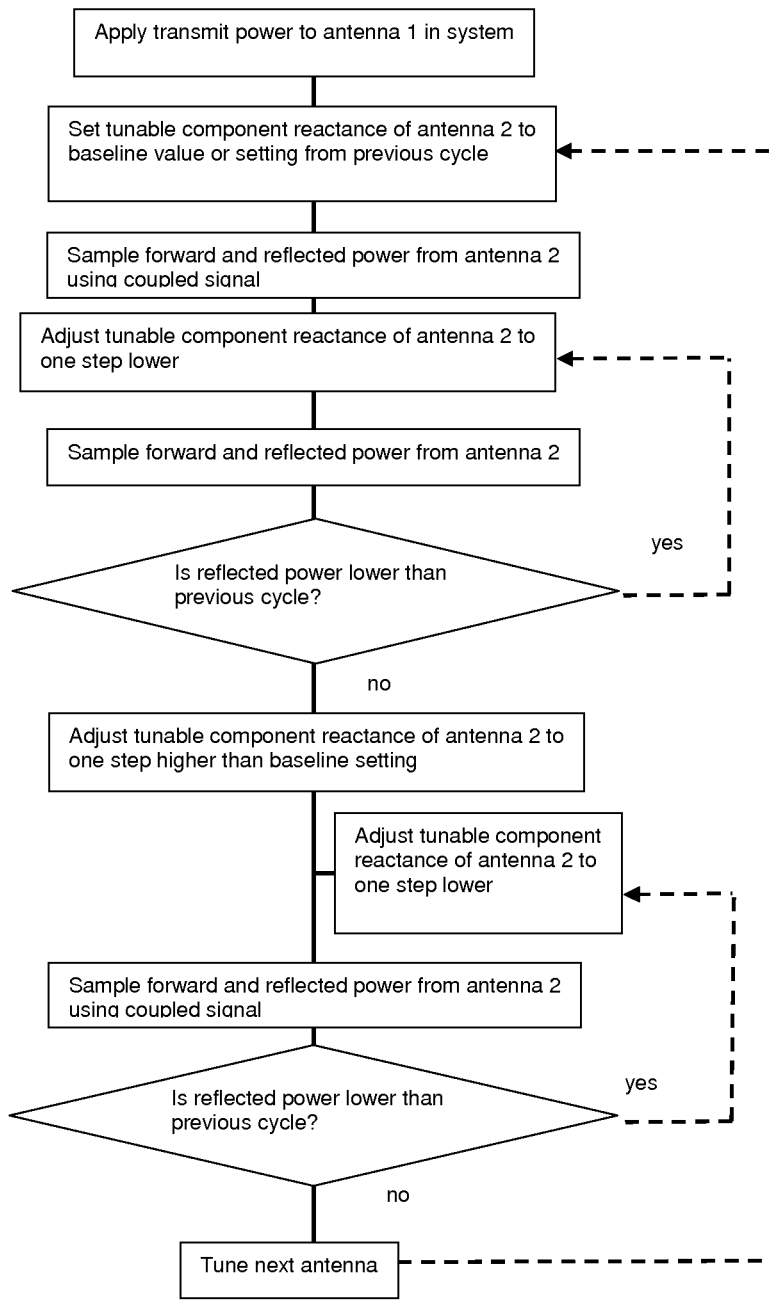
FIG. 7 illustrates an algorithm that is used to optimize the impedance match of a tunable antenna system.

FIG. 7 illustrates an algorithm that is used to optimize the impedance match of a tunable antenna system. This algorithm will tune the antennas while in the receive mode. A first antenna in the system is commanded to transmit and the coupled signal from this transmitted signal is used to tune the other antennas in the system to minimize reflected power at the antenna port being tuned, resulting in an improved impedance match.

Figure 8:
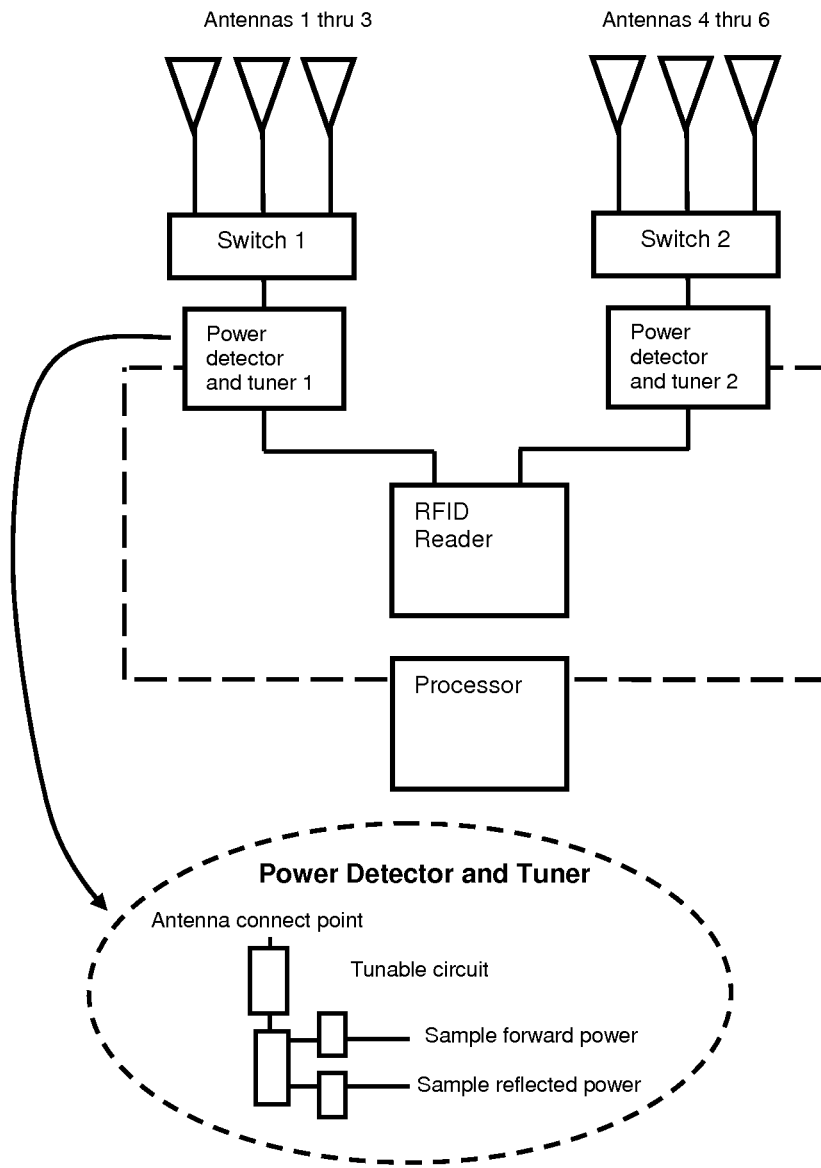
FIG. 8 illustrates an radio frequency identification (RFID) system comprising a six antenna system wherein the six antennas are tunable and can be impedance match using a coupled signal from an antenna in the system that is transmitting.

FIG. 8 illustrates an radio frequency identification (RFID) system comprising a six antenna system wherein the six antennas are tunable and can be impedance matched using a coupled signal from an antenna in the system that is transmitting. A switch assembly and power detector and tuner is connected to two three-antenna assemblies, with the power detector and tuner used to sample forward and reflected power and tune the antenna at the antenna port.

Figure 9:
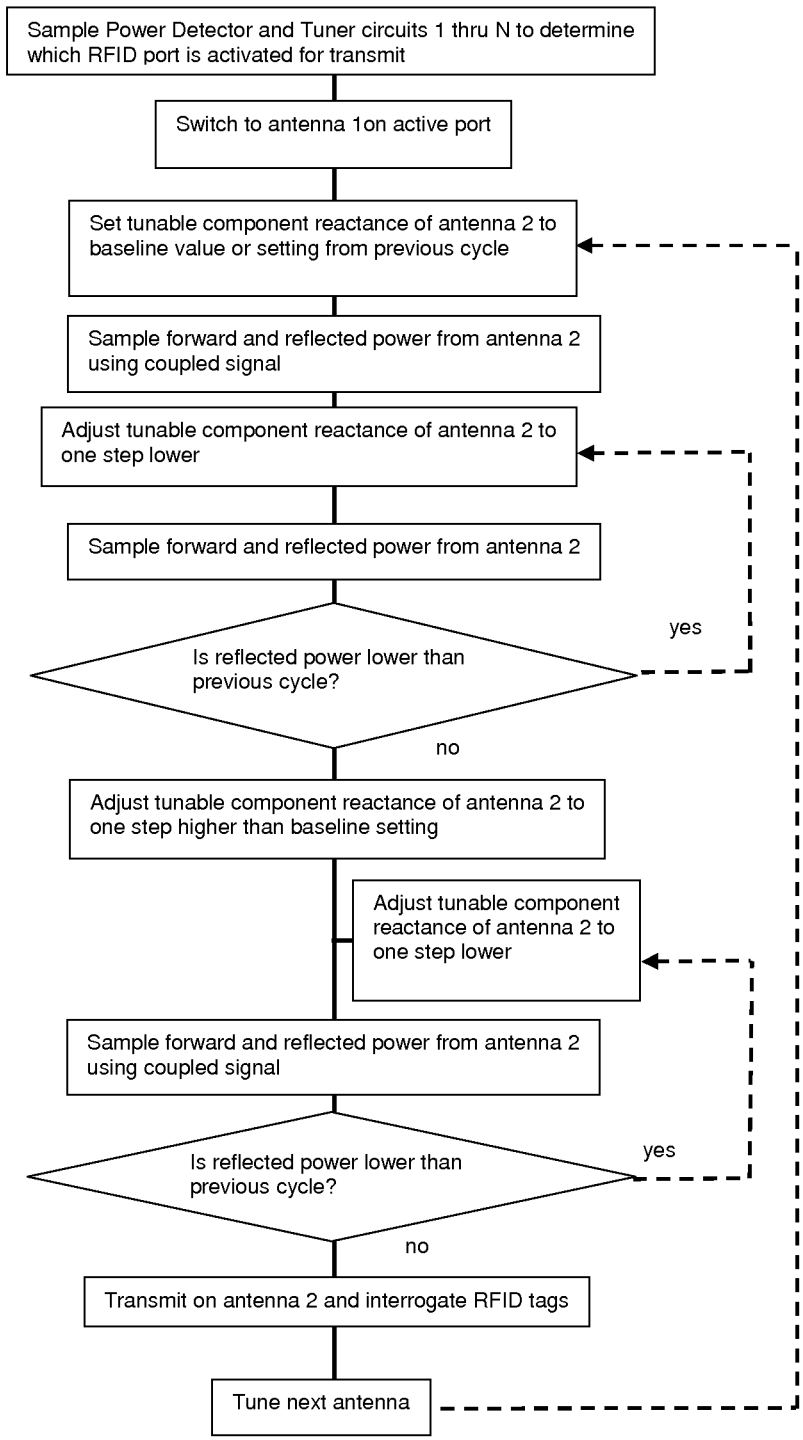
FIG. 9 illustrates an algorithm that is used to optimize the impedance match of a tunable antenna system configured for an RFID application.

FIG. 9 illustrates an algorithm that is used to optimize the impedance match of a tunable antenna system configured for an RFID application. This algorithm will first sample power at the output ports of the RFID reader to determine which port of the reader is currently being used for RFID tag interrogation. With one antenna in the system transmitting, the next antenna to be used for interrogation of RFID tags is tuned prior to applying transmit power. When the antenna is optimized, transmit power is applied to it and RFID tags are interrogated. During this interrogation process, the next antenna to be used is tuned, again prior to transmitting with this antenna. This algorithm will tune the antennas while in the receive mode. A first antenna in the system is commanded to transmit and the coupled signal from this transmitted signal is used to tune the other antennas in the system to minimize reflected power at the antenna port being tuned, resulting in an improved impedance match.

Figure 10:
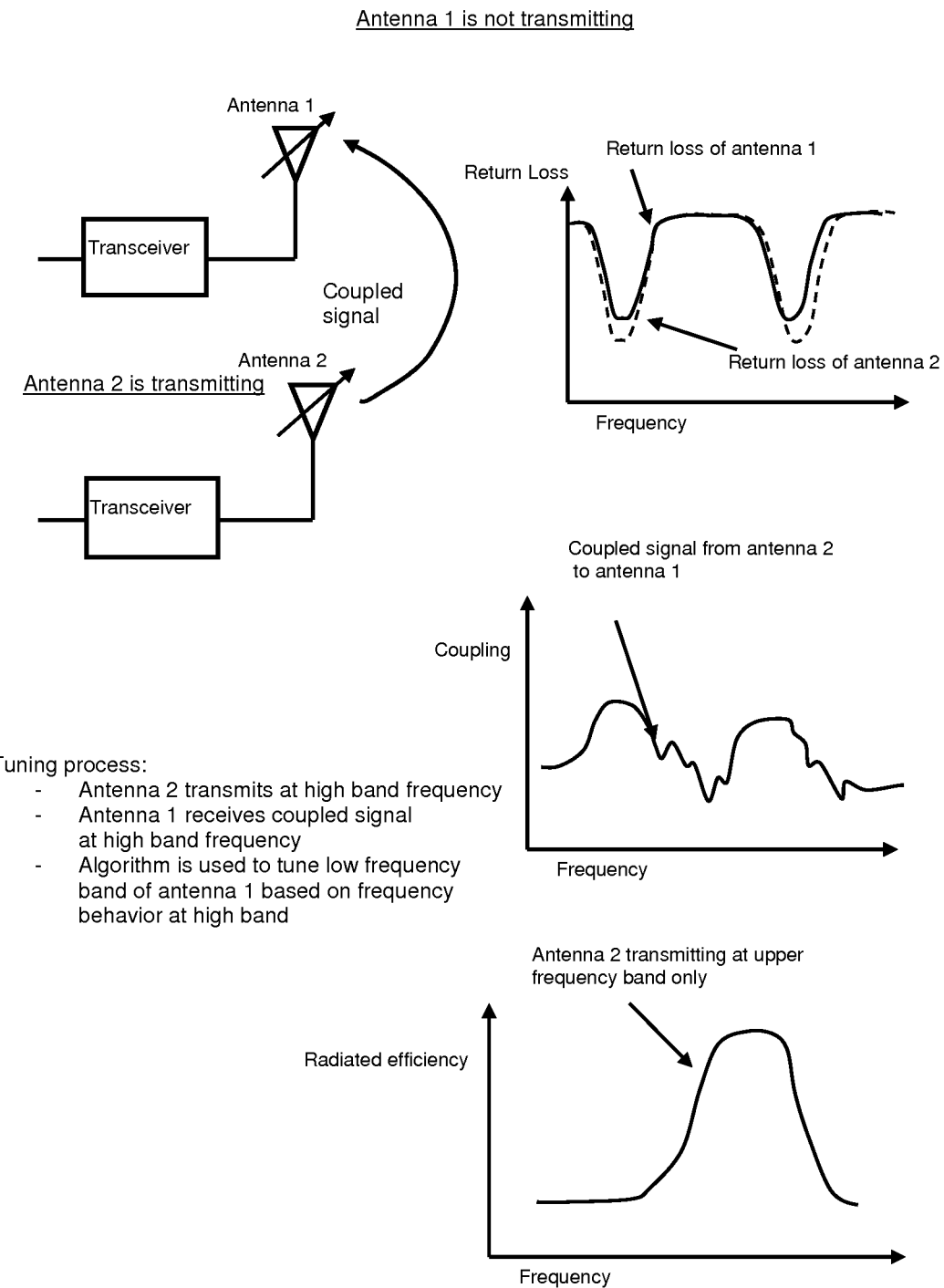
FIG. 10 illustrates an example of a two antenna system, wherein each antenna is tunable and each antenna has two resonances, a low band resonance and a high band resonance.

FIG. 10 illustrates an example of a two antenna system, wherein each antenna is tunable and each antenna has two resonances, a low band resonance and a high band resonance. The second antenna transmits a signal at the high band, with this signal coupled to and received by antenna 1. The received signal at high band is tuned to determine the state of de-tuning currently exhibited by the antenna; this information is processed in an algorithm which accesses a look-up table of data. The look-up table contains data of previously measured or calculated results which relate low band and high band tuning characteristics. The tuning characteristics of antenna 1 at high band is analyzed and antenna 1 is then tuned or altered to improve impedance match at the low frequency band resonance.

Figure 11:
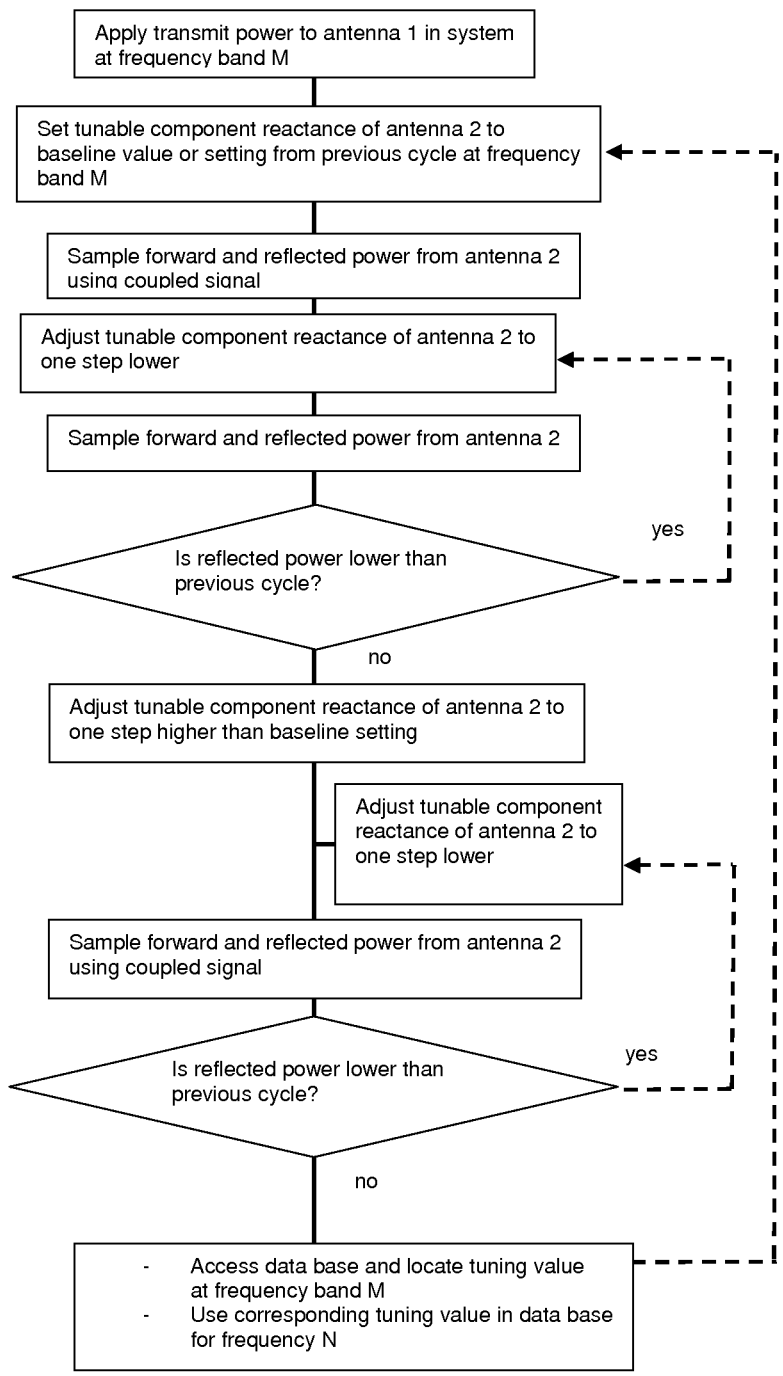
FIG. 11 illustrates an algorithm used to optimize the impedance match of a tunable antenna system where the tunable antenna is optimized at one frequency band, with this tuning information used to estimate antenna tuning state for a second frequency band.

FIG. 11 illustrates an algorithm that is used to optimize the impedance match of a tunable antenna system where the tunable antenna is optimized at one frequency band, with this tuning information used to estimate antenna tuning state for a second frequency band. This algorithm will tune the antennas while in the receive mode. A first antenna in the system is commanded to transmit at frequency band M and the coupled signal from this transmitted signal is used to tune the other antennas in the system at frequency band M to minimize reflected power at the antenna port being tuned, resulting in an improved impedance match. This tuning information at frequency band M is used to determine tuning state for the antennas being tuned at frequency band N by accessing a data base containing previously measured or calculated tuning information relating multiple frequency bands for a multi-band antenna.

Figure 12:
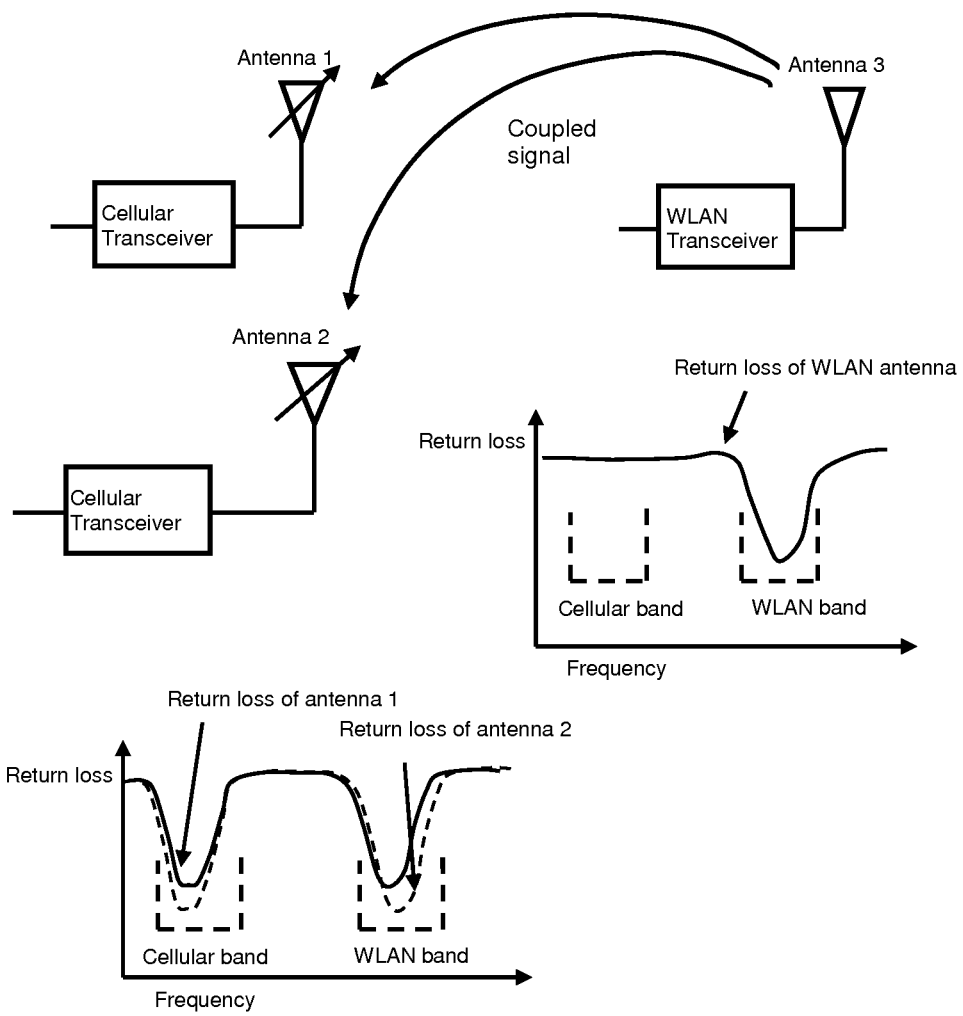
FIG. 12 illustrates an example of a three antenna system adapted for pre-optimization, comprising two cellular antennas, antenna 1 and antenna 2 and transceivers, and a WLAN antenna, antenna 3, and transceiver.

FIG. 12 illustrates an example of a three antenna system, consisting of two cellular antennas, antenna 1 and antenna 2, and transceivers and a WLAN antenna, antenna 3, and transceiver. The cellular antennas are tunable and each antenna has two resonances, a cellular frequency band resonance and a WLAN frequency band resonance. The WLAN antenna and transceiver transmits a signal which is coupled to both antenna 1 and antenna 2. The received signal at antennas 1 and 2 at the WLAN frequency band is used to tune each antenna at the WLAN frequency band to determine the state of de-tuning currently exhibited by antennas 1 and 2; this information is processed in an algorithm which accesses a look-up table of data. The look-up table contains data of previously measured or calculated results which relate cellular band and WLAN band tuning characteristics. The information from the look-up table is used to determine the tuning values of the component or components in the matching circuit to optimize the impedance match of antennas 1 and 2.

In certain embodiments, an antenna system comprises: an antenna element; and a matching circuit comprising one or multiple tunable components capable of varying reactance. The tunable component, or components, are adapted to alter the mismatch loss, return loss, and/or the impedance properties of the antenna by adjusting impedance of the matching circuit using a signal coupled or injected into the antenna prior to transmit power being applied to the antenna system.

In other embodiments, an antenna system comprises: two antenna elements, and a matching circuit comprising a tunable component capable of varying reactance of one or both of the antenna elements. The tunable component or components are adapted for dynamic adjustment to alter the mismatch loss, return loss, and/or the impedance properties of the antenna by using a signal coupled from the second antenna when the second antenna is transmitting a signal.

In other embodiments, three or more antennas can be incorporated into the antenna system. One or more of the antennas contain one or multiple tunable components in the matching circuit, with the tunable component or components adjusted to alter the mismatch loss, return loss, and/or the impedance properties of the antenna by adjusting impedance of the matching circuit using a signal coupled into the antenna from another antenna in the antenna system that is transmitting a signal, prior to transmit power being applied to the antenna being tuned.

Alternatively, two or more of the antennas may be coupled with one or multiple tunable components in the matching circuit. The tunable component, or components, of two or more antennas are adjusted simultaneously to alter the mismatch loss, return loss, and/or the impedance properties of the antenna by adjusting impedance of the matching circuits using a signal coupled into the antenna from another antenna in the antenna system that is transmitting a signal, prior to transmit power being applied to the antenna being tuned.

In yet another embodiment, an antenna system comprises: an antenna element, and a matching circuit comprising a tunable component capable of varying reactance of the antenna. The tunable component is of a type that cannot be adjusted or altered during transmit conditions. The tunable component, or components, are adapted for dynamic adjustment to alter the mismatch loss, return loss, and/or the impedance properties of the antenna by adjusting impedance of the matching circuit using a signal coupled or injected into the antenna prior to transmit power being applied to the antenna system.

In another embodiment, an antenna system comprises: two or more antenna elements, with one or more of the antenna elements individually coupled to one or multiple tunable components in the matching circuit. Two or more antennas cover two or more frequency bands.

A first antenna, Antenna 1, transmits a signal at one of the frequency bands. A portion of the transmitted signal is coupled to a second antenna, antenna 2, at the same frequency band. Antenna 2 is tuned at the frequency band of the coupled signal. A look-up table is accessed and the tuning value for the tunable component is selected to optimize the impedance match of antenna 2 at a second frequency band.

We claim:

1. A method for pre-optimization of an antenna transmit circuit, comprising:
    providing an antenna system coupled to a transceiver and a processor, said antenna system comprising a first antenna element and a second antenna element positioned in proximity with said first antenna element, the first and second antenna elements each being coupled to one or more tunable components, wherein said one or more tunable components are adapted to vary a reactance of said first and second antenna elements, respectively;
    applying transmit power to the first antenna element;
    setting the one or more tunable components coupled to the second antenna element to one of: a baseline value or a setting from a previous cycle;
    with said second antenna element being positioned in proximity with said first antenna element, receiving a coupled signal from the first antenna element;
    sampling forward and reflected power from the second antenna element using the coupled signal to measure performance in a first cycle;
    adjusting reactance of the one or more tunable components coupled to the second antenna element to one step lower than the baseline value or the setting from a previous cycle;
    repeating the sampling of forward and reflected power from the second antenna element using the coupled signal in a subsequent cycle; and
    if reflected power measured in the subsequent cycle is lower than that of the first cycle, adjusting reactance of the one or more tunable components coupled to the second antenna element to one step lower than the baseline value or the setting from a previous cycle and repeating the sampling of forward and reflected power from the second antenna element using the coupled signal in a subsequent cycle, otherwise:
    adjusting reactance of the one or more tunable components coupled to the second antenna element to one step higher than the baseline value.

2. The method of claim 1, repeated for tuning the second antenna element.

* * * * *